(12) United States Patent
Cho et al.

(10) Patent No.: US 7,549,881 B2
(45) Date of Patent: Jun. 23, 2009

(54) LAMP SOCKET, BACKLIGHT ASSEMBLY HAVING THE SAME AND DISPLAY DEVICE HAVING THE SAME

(75) Inventors: Joo-Woan Cho, Seoul (KR); Seong-Sik Choi, Seoul (KR); Hyeon-Yong Jang, Osan-si (KR); Tae-Seok Jang, Seoul (KR); Jin-Sung Choi, Cheonan-si (KR); Du-Hwan Chung, Suwon-si (KR); Dong-Hoon Kim, Seoul (KR); Seung-Ha Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/782,318

(22) Filed: Jul. 24, 2007

(65) Prior Publication Data

US 2008/0024068 A1    Jan. 31, 2008

(30) Foreign Application Priority Data

Jul. 25, 2006    (KR) .................... 10-2006-0069809

(51) Int. Cl.
*H01R 33/08* (2006.01)
*H01R 33/02* (2006.01)

(52) U.S. Cl. .................................... 439/235

(58) Field of Classification Search ................. 439/226, 439/231, 235, 239; 362/225
See application file for complete search history.

(56) References Cited

U.S. PATENT DOCUMENTS

| | | | |
|---|---|---|---|
| 7,265,500 B2 * | 9/2007 | Ono et al. | 315/291 |
| 2004/0080925 A1 * | 4/2004 | Moon | 362/29 |
| 2007/0002554 A1 * | 1/2007 | Lim | 362/97 |

FOREIGN PATENT DOCUMENTS

| | | |
|---|---|---|
| JP | 2006-066359 | 3/2006 |
| KR | 1020050014274 | 2/2005 |
| KR | 1020060023455 | 3/2006 |

* cited by examiner

*Primary Examiner*—Javaid Nasri
(74) *Attorney, Agent, or Firm*—F. Chau & Associates, LLC

(57) ABSTRACT

A lamp socket includes a socket housing and a plurality of power supply members. The socket housing has a plurality of connecting holes extended in a vertical direction. The power supply members are disposed in the connecting holes, respectively, and each of the power supply members includes a plurality of lamp connecting parts and an inverter connecting part. The lamp connecting parts are protruded from an upper surface of the socket housing and include first and second portions facing each other. The inverter connecting part is integrally formed with the lamp connecting parts, and is protruded from a lower surface of the socket housing.

11 Claims, 11 Drawing Sheets

LAMP SOCKET, BACKLIGHT ASSEMBLY HAVING THE SAME AND DISPLAY DEVICE HAVING THE SAME

CROSS-REFERENCE TO RELATED APPLICATION

The present application claims priority to Korean Patent Application No. 2006-69809, filed on Jul. 25, 2006, the contents of which are herein incorporated by reference in their entirety.

BACKGROUND OF THE INVENTION

1. Technical Field

The present invention relates to a lamp socket, a backlight assembly having the lamp socket and a display device having the lamp socket, and more particularly, to a lamp socket combined with a lamp and a power supply substrate.

2. Discussion of the Related Art

A backlight assembly of a liquid crystal display (LCD) device may include a direct illumination type backlight assembly or an edge illumination type backlight assembly based on a location of a light source.

A backlight assembly may include a cold cathode fluorescent lamp (CCFL) as the light source. The direct illumination type backlight assembly having the CCFL includes a lamp socket to fix lamps on a bottom plate of a receiving container. In order to facilitate fixing of the lamps to the bottom plate, the backlight assembly including a lamp socket combined with an electrode portion of the lamp through a fitting combination has been developed.

In a manufacturing process for assembling the backlight assembly, a wire of an inverter is soldered to a plurality of sockets, or terminals of the lamp sockets are soldered to the inverter, thereby applying a driving voltage to the lamps.

When the inverter is electrically connected to the sockets through the soldering process, assembly time may be increased and the lamps may be damaged during the soldering process, thereby decreasing yield. In addition, if one of the inverters is defective, all of the lamps need to be removed to replace the broken inverter, thereby increasing repair time.

SUMMARY OF THE INVENTION

Embodiments of the present invention provide a lamp socket combined with a lamp and a power supply substrate capable of simplifying a manufacturing process, a backlight assembly having the lamp socket, and a display device having the lamp socket.

A lamp socket in accordance with an exemplary embodiment of the present invention may include a socket housing and a plurality of power supply members. The socket housing has a plurality of connecting holes extended in a vertical direction. The power supply members are disposed in the connecting holes, respectively, and each of the power supply members includes a plurality of lamp connecting parts and an inverter connecting part. The lamp connecting parts are protruded from an upper surface of the socket housing and include first and second portions that face each other. The inverter connecting part is integrally formed with the lamp connecting parts, and is protruded from a lower surface of the socket housing.

The socket housing may include a connecting part extended in a direction substantially perpendicular to the vertical direction, and a plurality of lamp holders protruded from an upper surface of the connecting part. The connecting holes may be formed through the lamp holders. The inverter connecting part may have a spring shape.

A backlight assembly in accordance with an exemplary embodiment of the present invention includes a receiving container, a plurality of lamps, a lamp socket and a power supply substrate. The receiving container may include a bottom plate having an opening and a sidewall protruded from a side of the bottom plate. The lamps are disposed on the bottom plate, and each of the lamps includes a lamp body and an electrode portion on an end portion of the lamp body. The lamp socket is inserted into the opening and includes a socket housing and a plurality of power supply members. The socket housing has a plurality of connecting holes extended in a vertical direction of the receiving container. The power supply members are disposed in the connecting holes, respectively, and each of the power supply members includes a plurality of lamp connecting parts and an inverter connecting part. The lamp connecting parts may be protruded toward the bottom plate of the receiving container to make contact with opposite sides of the end portion. The inverter connecting part is integrally formed with the lamp connecting parts, and is protruded toward an upper portion of the receiving container. The power supply substrate includes a plurality of output terminals on a side of the power supply substrate, and the output terminals make contact with the inverter connecting part.

The backlight assembly may further include a side cover including a side portion, an upper portion and a plurality of fixing portions. The side portion has a plurality of guiding grooves to guide the lamps. The upper portion is extended from the side portion to cover the lamp socket. The fixing portions are protruded from a bottom surface of the upper portion corresponding to the power supply members so that the lamp connecting parts make contact with the electrode portion. A fixing recess, into which each of the lamp connecting parts is inserted, may be formed at each of the fixing portions. Each of the lamp connecting parts may include a catching portion extended in the vertical direction to face the fixing recess, and a contact portion bent from an upper portion of the catching portion to make contact with the electrode portion. The catching portion may have a holding protrusion combined with the fixing recess. The side of the power supply substrate may be inserted into a space between a lower surface of the lamp holders and the inverter connecting parts that face the lower surface of the lamp holders. A plurality of grooves may be formed on the side of the power supply substrate between the output terminals, so that the side of the power supply substrate may have a convex and concave shape when viewed from a plane. A first aligning part may be formed on a lower surface of each of the lamp holders adjacent to each of the connecting holes, and a second aligning part combined with the first aligning part is formed on the power supply substrate.

A display device in accordance with an exemplary embodiment of the present invention includes a receiving container, a plurality of lamps, a lamp socket, a power supply substrate, a side cover, optical sheets disposed on the side cover and a display panel disposed on the optical sheets.

According to the lamp socket, the backlight assembly having the lamp socket and the display device having the lamp socket of the present invention, the number of elements of the lamp socket may be decreased, and a wiring between the lamps and the lamp socket, and a wiring between the lamp socket and the power supply substrate may be omitted. Also, a soldering process between the lamps and the lamp socket and a wiring between the lamp socket and the power supply substrate may be omitted. Therefore, a manufacturing process for assembling the backlight assembly and the display device may be simplified, and the power supply substrate may be easily repaired.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. It will be understood that when an element or layer is referred to as being "on," "connected to" or "coupled to" another element or layer, it can be directly on connected or coupled to the other element or layer or intervening elements or layers may be present.

Figure 1:
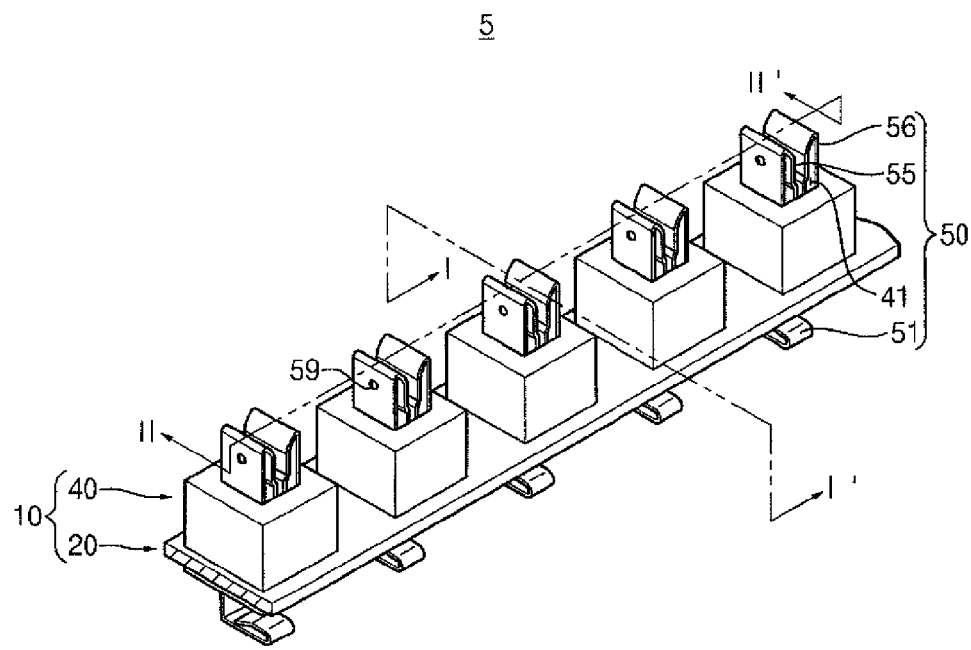
FIG. 1 is a perspective view illustrating a lamp socket in accordance with an exemplary embodiment of the present invention.
Figure 2:
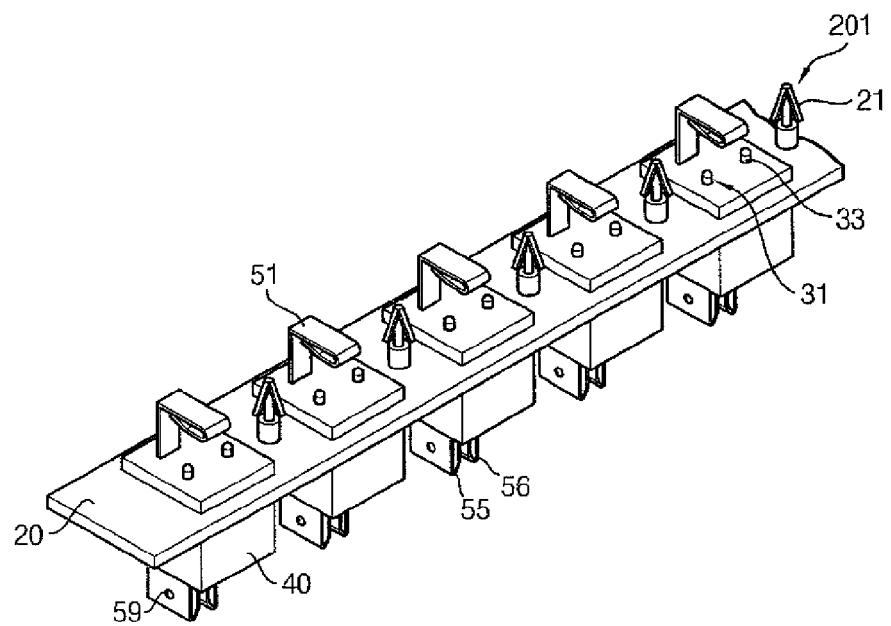
FIG. 2 s a perspective view illustrating a rear portion of the lamp socket shown in FIG. 1.

FIG. 1 is a perspective view illustrating a lamp socket in accordance with an exemplary embodiment of the present invention. FIG. 2 is a perspective view illustrating a rear portion of the lamp socket shown in FIG. 1.

A lamp socket fixes a plurality of lamps to a receiving container to apply a lamp driving voltage to the lamps. The lamps supply a display panel with light. Referring to FIGS. 1 and 2, the lamp socket 5 includes a socket housing 10 and a plurality of power supply members 50.

The socket housing 10 may be formed through an injection molding process. The socket housing 10 includes a plurality of connecting holes 41 extended in a vertical direction. The socket housing 10 may further include a connecting part 20 and a plurality of lamp holders 40.

The connecting part 20 may have a plate shape extended in a longitudinal direction. A plurality of first fixing portions 201 may be formed on a lower surface of the connecting part 20. The first fixing portions 201 may include a plurality of fixing hooks 21 spaced apart from each other by a constant distance. For example, the fixing hooks 21 may be combined with fixing holes formed through the receiving container.

Each of the lamp holders 40 may be protruded from an upper surface of the connecting part 20 by a first height. The lamp holders 40 are interposed between the fixing hooks 21. The lamp holders 40 may be protruded from the lower surface of the connecting part 20 by a second height that is smaller than the first height.

Each of the lamp holders 40 includes four lamp holding sidewalls and a lamp holding upper plate connected to the four lamp holding sidewalls. The connecting hole 41 is formed through the upper plate of the lamp holder 40.

For example, an aligning part may be formed under the lamp holder 40, and may include an aligning protrusion 33. The aligning protrusion 33 may be protruded from the lower surface of the connecting part 20. The aligning protrusion 33 guides a power supply substrate disposed under the lamp holder 40 to align an output terminal of the power supply substrate.

Figure 3:
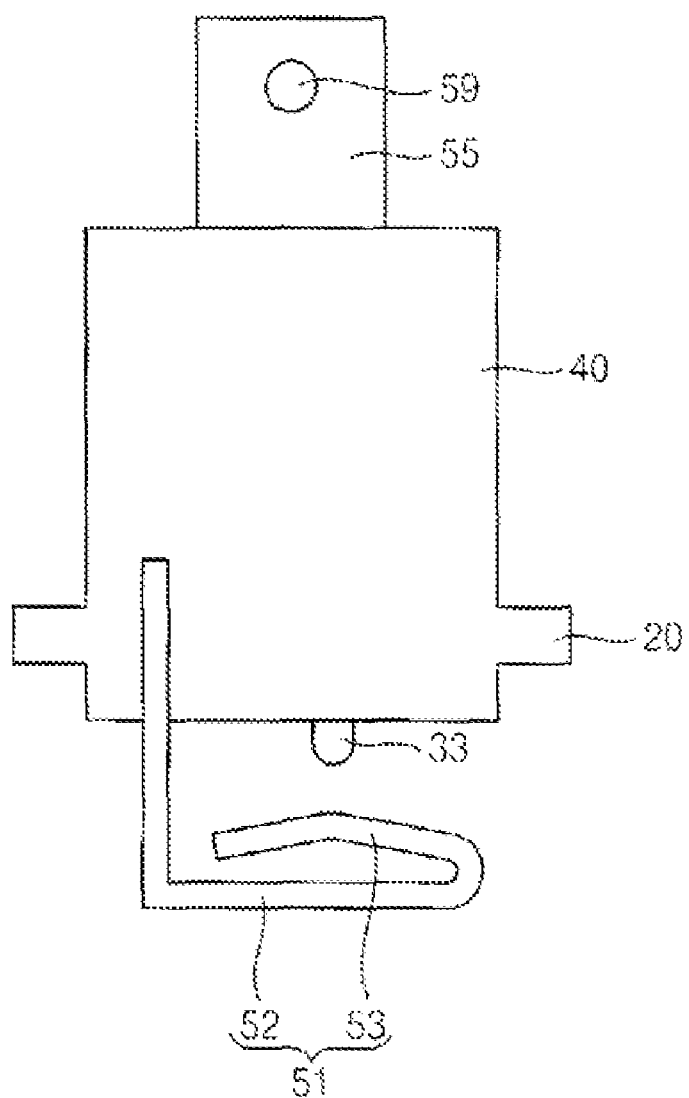
FIG. 3 is a cross-sectional view taken along a line I-I' shown in FIG. 1.
Figure 4:
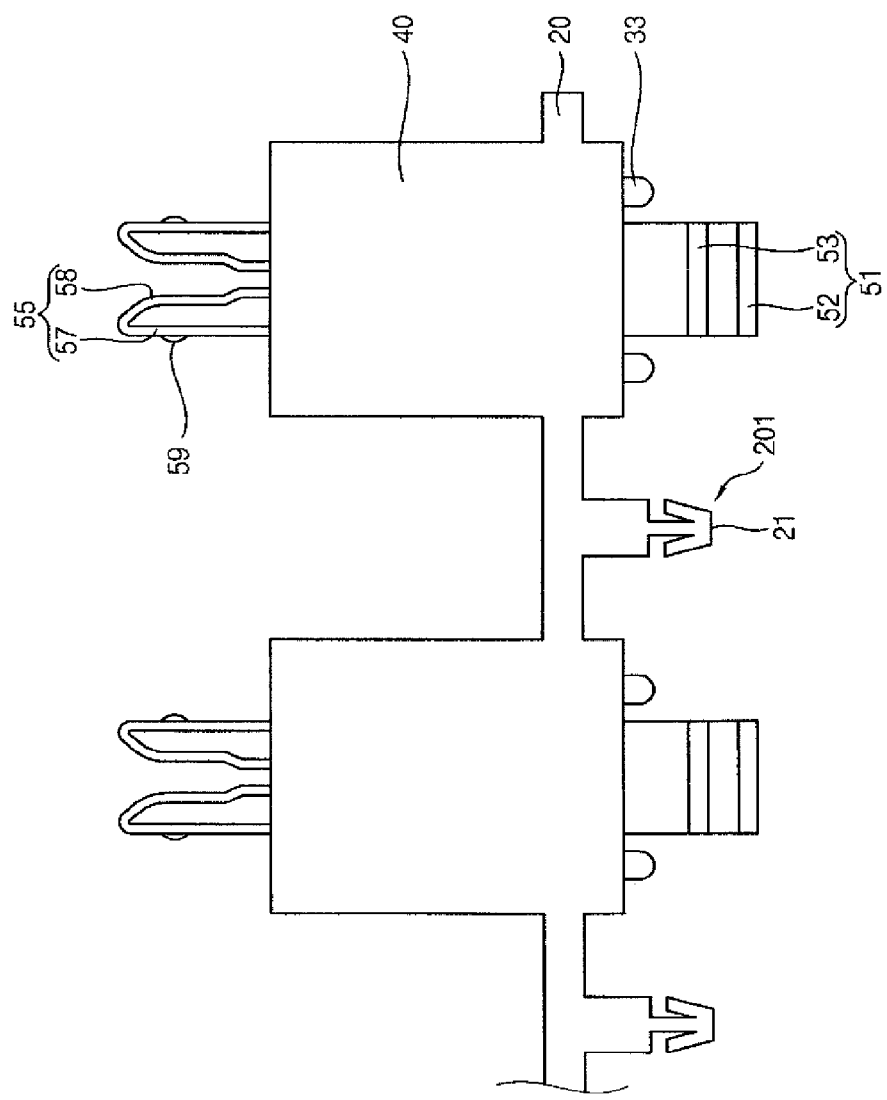
FIG. 4 is a cross-sectional view taken along a line II-II' shown in FIG. 1.

FIG. 3 is a cross-sectional view taken along a line I-I' shown in FIG. 1 FIG. 4 is a cross-sectional view taken along a line II-II' shown in FIG. 1

Referring to FIGS. 1, 3 and 4, each of the power supply members 50 is inserted into each of the connecting holes 41. The power supply member 50 may include, for example, metal. The power supply member 50 may include, for example, a plurality of integrated lamp connecting parts 55 and 56 and/or a plurality of inverter connecting parts 51.

The lamp connecting parts 55 and 56 apply the lamp driving voltage to an electrode portion of a lamp. In FIGS. 1 to 4, the power supply member 50 includes two lamp connecting parts 55 and 56. For example, the lamp connecting parts 55 and 56 may include a first lamp connecting part 55 and a second lamp connecting part 56 opposite to the first lamp connecting part 55.

The first and second lamp connecting parts 55 and 56 are exposed toward an upper portion of the connecting hole 41, and face each other. The power supply member 50 may further include a conductive line in the connecting hole 41. The first and second connecting parts 55 and 56 may be electrically connected to each other through the conductive line.

The first and second lamp connecting parts 55 and 56 may have a substantially symmetric shape with respect to a central line passing through the connecting hole 41. Each of the first and second connecting parts 55 and 56 may have a clamp shape. Each of the first and second connecting parts 55 and 56 may include a catching portion 57 and a contact portion 58.

The catching portion 57 is extended in the vertical direction and is protruded from an upper portion of the connecting hole 41. The contact portion 58 is bent from an upper end of the catching portion 57, and is extended toward the connecting hole 41. The contact portions 58 of the first and second lamp connecting parts 55 and 56 face each other. For example, a distance between the contact portions 58 of the first and second lamp connecting parts 55 and 56 may be decreased, as a distance from an upper portion of the connecting hole 41 may be decreased.

When an externally provided fixing element makes contact with the catching portions 57 of the first and second lamp connecting parts 55 and 56, the catching portions 57 are elastically deformed toward the central line of the connecting hole 41. Thus, the contact portions 58 make contact with the electrode portion of the lamp, which is interposed between the contact portions 58.

A holding protrusion 59 may be formed on an upper portion of the catching portion 57. For example, the holding protrusion 59 may be combined with a groove formed on the externally provided fixing element so that the externally provided fixing element is not removed from the first and second connecting pads 55 and 56.

The first and second connecting parts 55 and 56 may have various shapes.

The inverter connecting part 51 is exposed through a lower portion of the connecting hole 41. The inverter connecting part 51 may make contact with the output terminal of the power supply substrate. The inverter connecting part 51 may have one of a variety of shapes. For example, the inverter connecting part 51 may have a spring shape, such as, for example, a leaf spring shape, so that the inverter connecting part 51 makes secure contact with the output terminal by using elasticity of the spring.

In FIGS. 1 to 4, the inverter connecting part 51 may include a supporting portion 52 and an electric power receiving portion 53. In FIG. 3, the supporting portion 52 is electrically connected to the conductive line that is electrically connected to the first and second lamp connecting parts 55 and 56, and is protruded from the lower surface of the connecting part 20. The supporting portion 52 is bent to face the lower surface of the lamp holder 40. The electric power receiving portion 53 is bent from an end portion of the supporting portion 52 to overlap the supporting portion 52. The electric power receiving portion 53 may have a convex shape with respect to the supporting portion 52. Thus, the electric power receiving portion 53 is elastically deformed based on an externally provided pressure so that the electric power receiving portion 53 is securely connected to the output terminal.

Figure 5:
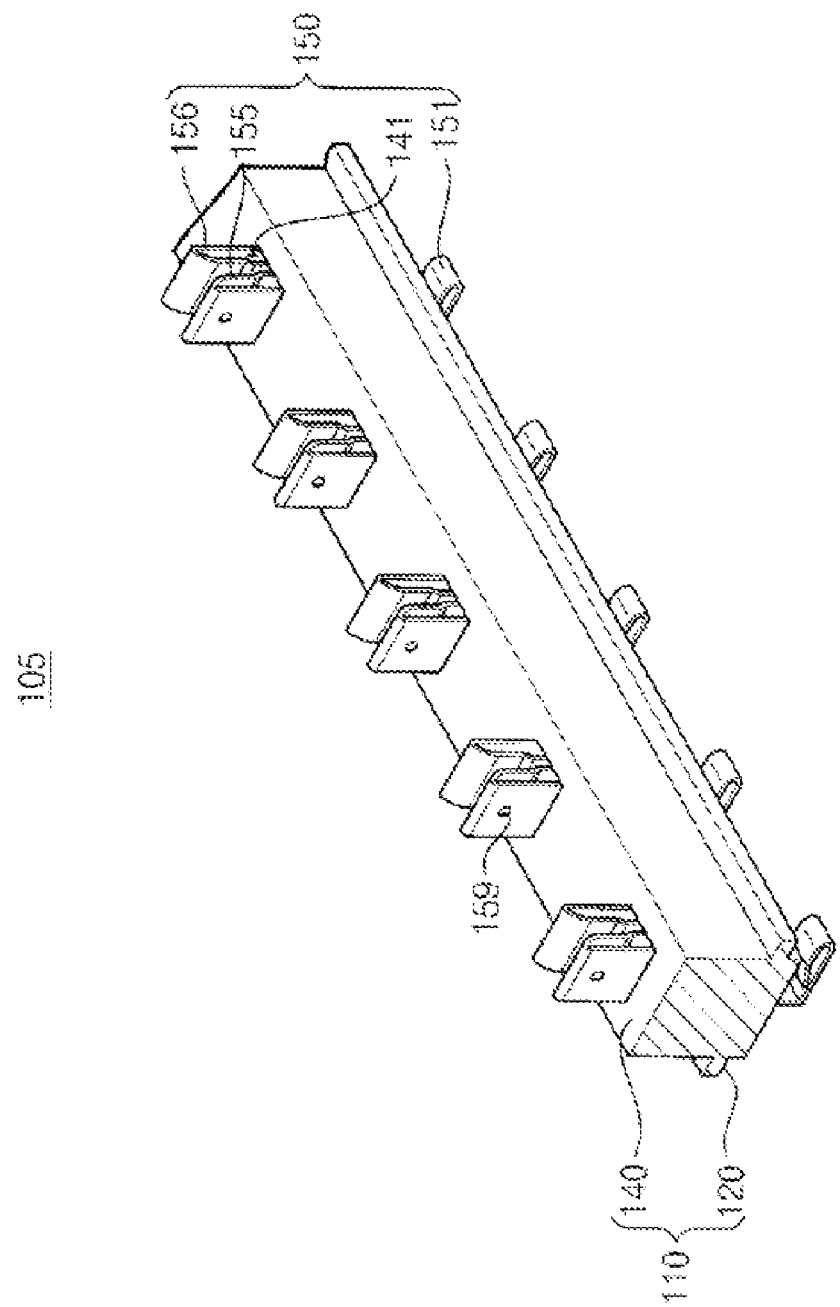
FIG. 5 is a perspective view illustrating a lamp socket in accordance with an exemplary embodiment of the present invention.

FIG. 5 is a perspective view illustrating a lamp socket in accordance with an exemplary embodiment of the present invention.

Referring to FIG. 5, the lamp socket 105 that is integrated includes a socket housing 110 and a plurality of power supply members 150. The lamp socket 105 of FIG. 5 is substantially the same as the lamp socket 5 of FIGS. 1 to 4 at least except for a socket housing 110. Thus, the same reference numerals will be used to refer to the same or like parts as those described in FIGS. 1 to 4.

The socket housing 110 includes a connecting part 120 and a lamp holder 140.

The connecting part 120 has a plate shape extending in a longitudinal direction of the lamp socket 105. The lamp holder 140 is protruded from an upper surface of the connecting part 120 by a first height, and the connecting part 120 is protruded from a lower surface of the connecting part 120 by a second height that is smaller than the first height. In an exemplary embodiment, the socket housing 110 may have a quadrangular parallelepiped shape. The socket housing 110 may have a rectangular parallelepiped shape. The socket housing 110 of FIG. 5 is substantially the same as the socket housing 10 of FIGS. 1 to 4 at least except for the shape of the socket housing 10.

A plurality of connecting holes 141 is formed on an upper portion of the lamp holder 140, and passes through the lamp holder 140 in the vertical direction. A plurality of fixing hooks may be formed between the connecting holes 141.

Combination between the power supply member 150 and the connecting hole 141 of FIG. 5 is substantially the same as in FIGS. 1 to 4. Thus, any further explanation concerning the above elements will be omitted.

Figure 6:
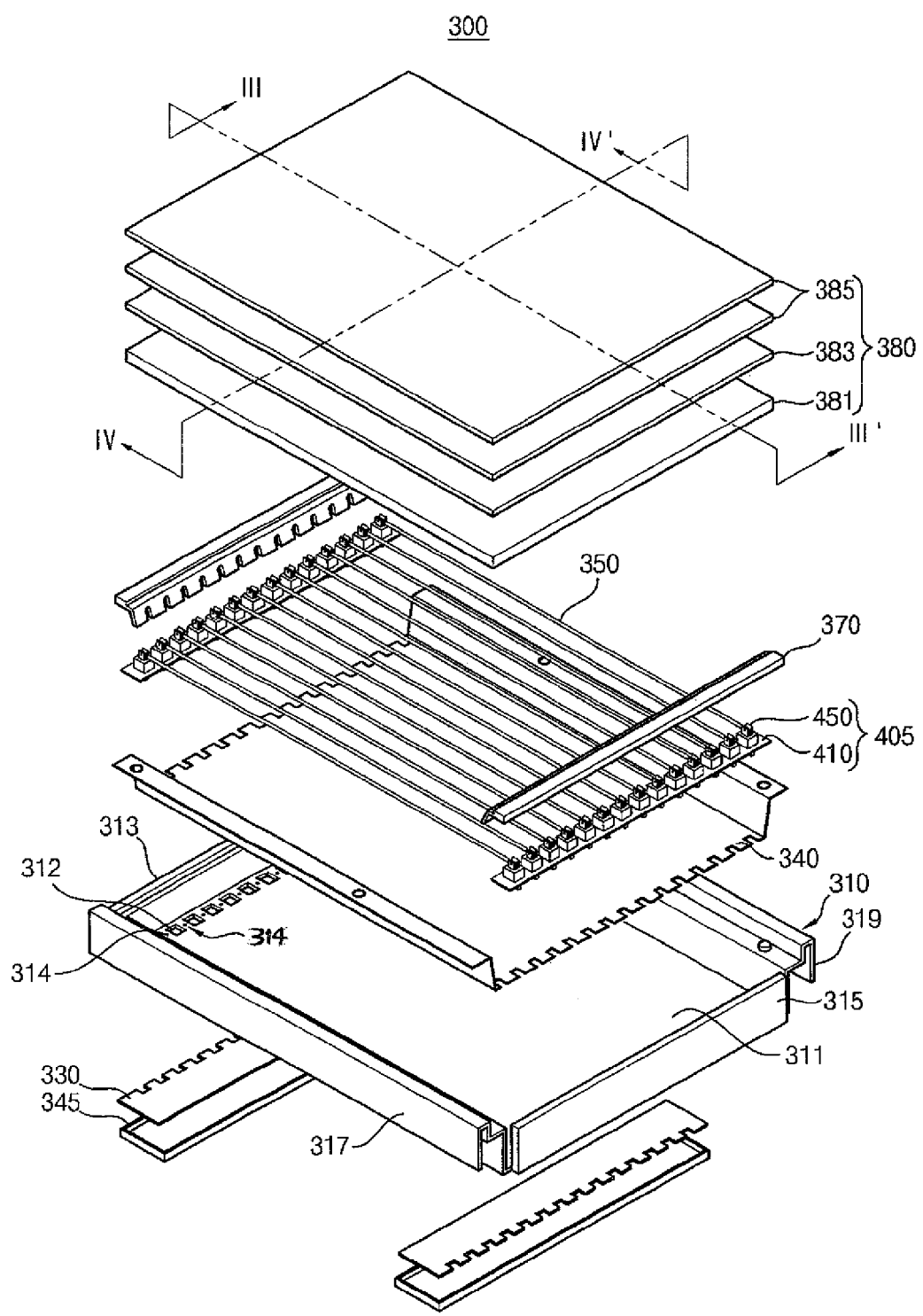
FIG. 6 is an exploded perspective view illustrating a backlight assembly in accordance with an exemplary embodiment of the present invention.

FIG. 6 is an exploded perspective view illustrating a backlight assembly in accordance with an exemplary embodiment of the present invention.

Referring to FIG. 6, the backlight assembly 300 includes a receiving container 310, a plurality of lamps 350, a power supply substrate 330 and a plurality of lamp sockets 405. In FIG. 6, the lamp sockets 405 are integrated.

The receiving container 310 includes a bottom plate 311, a first sidewall 313, a second sidewall 315, a third sidewall 317 and a fourth sidewall 319. The first, second, third and fourth sidewalls 313, 315, 317 and 319 are protruded from sides of the bottom plate 311 to form a receiving space. The first and second sidewalls 313 and 315 face each other. The third and fourth sidewalls 317 and 319 face each other, and are connected between the first and second sidewalls 313 and 315. A stepped portion is formed on an upper portion of the first, second, third and fourth sidewalls 313, 315, 317 and 319. A plurality of openings 312 are formed on the bottom plate 311 adjacent to the first and second sidewalls 313 and 315. A second fixing portion 314 may be formed between the openings 312. For example, the second fixing portion 314 may include a plurality of fixing holes.

The lamps 350 are aligned on the bottom plate 311 to generate light. The lamps 350 may be aligned substantially parallel with each other so that a longitudinal direction of the lamps 350 may be substantially parallel with the third and fourth sidewalls 317 and 319. Each of the lamps 350 includes a lamp body and an electrode portion. The lamp body may have a cylindrical shape, and a discharge gas may be injected into the lamp body. The discharge gas may include argon and mercury. The electrode portion is on an end portion of the lamp body. The electrode portion may include a discharge electrode and a lead wire. The discharge electrode may be disposed in the lamp body, and the lead wire is extended from the discharge electrode toward an exterior to the lamp body.

The lamp 350 may include an external electrode fluorescent lamp (EEFL) having various characteristics such as high brightness, low manufacturing cost, low power consumption, etc. A plurality of EEFLs may be driven by a single power supply unit.

The backlight assembly 300 may further include a reflecting plate 340. The reflecting plate 340 is disposed on the bottom plate 311 of the receiving container 310 to reflect the light generated from the lamps 350 toward an upper portion of the backlight assembly 300.

Figure 7:
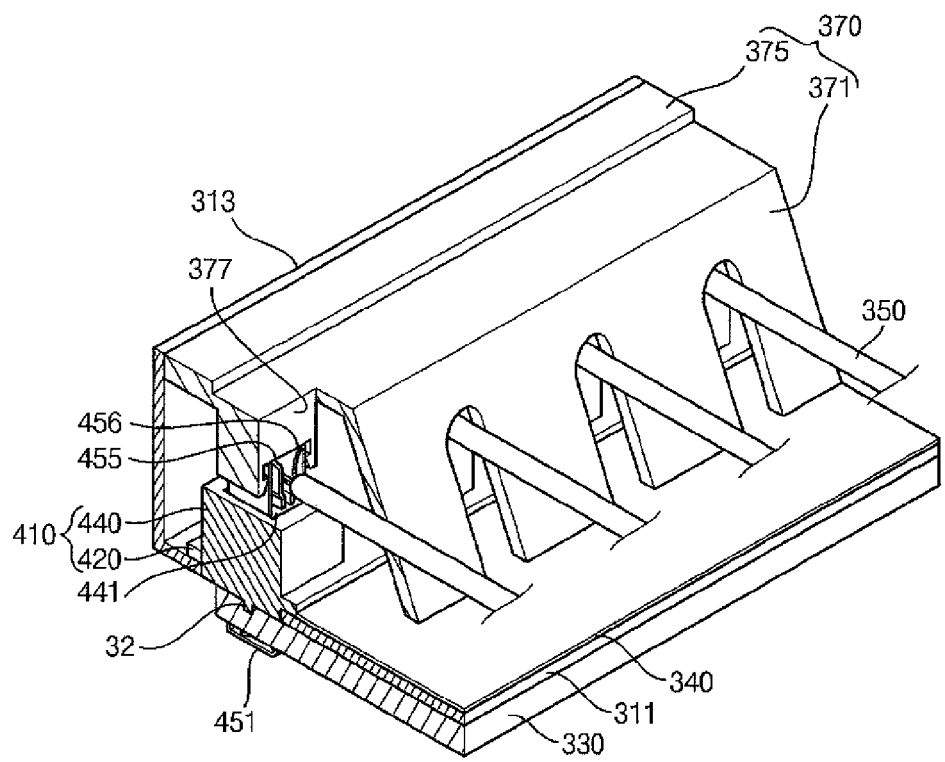
FIG. 7 is an enlarged perspective view illustrating the backlight assembly shown in FIG. 6.
Figure 8:
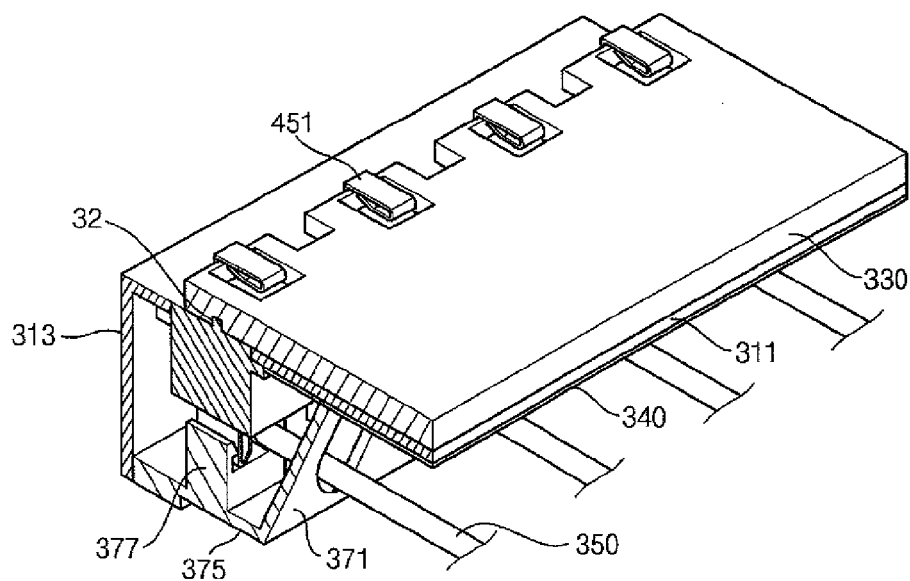
FIG. 8 is a perspective view illustrating a rear portion of the backlight assembly shown in FIG. 7.

FIG. 7 is an enlarged perspective view illustrating the backlight assembly shown in FIG. 6. FIG. 8 is a perspective view illustrating a rear portion of the backlight assembly shown in FIG. 7.

Referring to FIGS. 6, 7 and 8, the lamp socket 405 are aligned on the bottom plate 311 along the first and second sidewalls 313 and 315. The lamp socket 405 adjacent to the first sidewall 313 is substantially the same as the lamp socket 405 adjacent to the second sidewall 315. Thus, any further explanation concerning the lamp socket 405 adjacent to the second sidewall 315 will be omitted.

The lamp socket 405 of FIGS. 7 and 8 is substantially the same as the lamp socket 5 of FIGS. 1 to 4. Each of the lamp sockets 405 includes a socket housing 410 and a plurality of power supply members 450.

The socket housing 410 includes a connecting part 420 and a plurality of lamp holders 440. The lamp holders 440 that are protruded from a lower surface of the connecting part 420 are received in the openings 312 that are formed through the bottom plate 311. The connecting part 420 is supported by a bottom surface of the bottom plate 311, and a plurality of fixing hooks that are formed on the lower surface of the lamp holder 440 is inserted into the fixing holes 314, respectively. Thus, the socket housing 410 is fixed to the bottom plate 311. The lamp holders 440 that are protruded from an upper surface of the connecting part 420 are disposed in the receiving space of the receiving container 310. The inverter connecting part 451 is exposed from a rear surface of the bottom plate 311.

Figure 9:
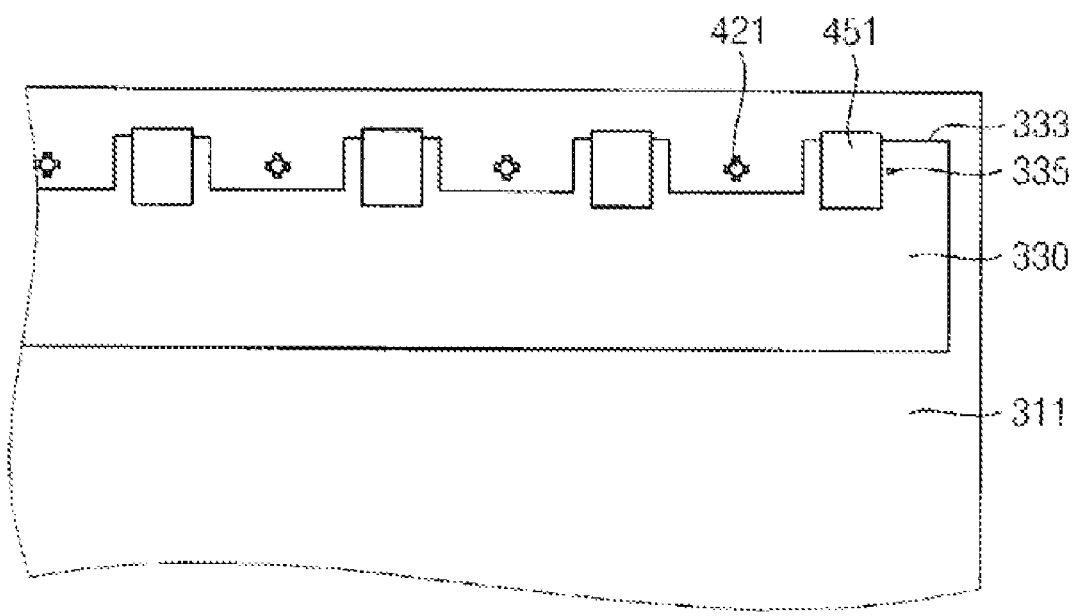
FIG. 9 is a plan view illustrating a rear surface of the backlight assembly shown in FIG. 6.

FIG. 9 is a plan view illustrating a rear surface of the backlight assembly shown in FIG. 6.

Referring to FIGS. 6, 7 and 9, the power supply substrate 330 is on the rear surface of the bottom plate 311, and generates a lamp driving voltage. The power supply substrate 330 may further include a printed circuit board (PCB) and a power supply element mounted on the PCB.

A side of the power supply substrate 330 is inserted into a space between the lower surface of the lamp holder 440 and the inverter connecting part 451. The side of the power supply substrate 330 includes a plurality of output terminals corresponding to the inverter connecting parts 451,respectively. For example, conductive lines formed on the PCB may be partially exposed to form the output terminals. A second aligning part 32 (also 335)corresponding to a first aligning part 31 (also 33 and 433) formed on the lower surface of the lamp holder 440 may be formed adjacent to the output terminals. For example, the first and second aligning parts may be an aligning protrusion 31, 33 or 433 and an aligning hole 32 or 335, respectively.

A plurality of grooves may also be formed on the side of the power supply substrate between the output terminals when viewed from a plane. Thus, the side of the power supply substrate may have a convex and concave shape when viewed from the plane.

In FIGS. 5 to 9, the output terminals are formed on the rear surface of the power supply substrate 330. Alternatively, the output terminals may be formed on the upper surface of the power supply substrate 330. The output terminals may also be formed on the upper and rear surfaces of the power supply substrate 330.

Figure 10:
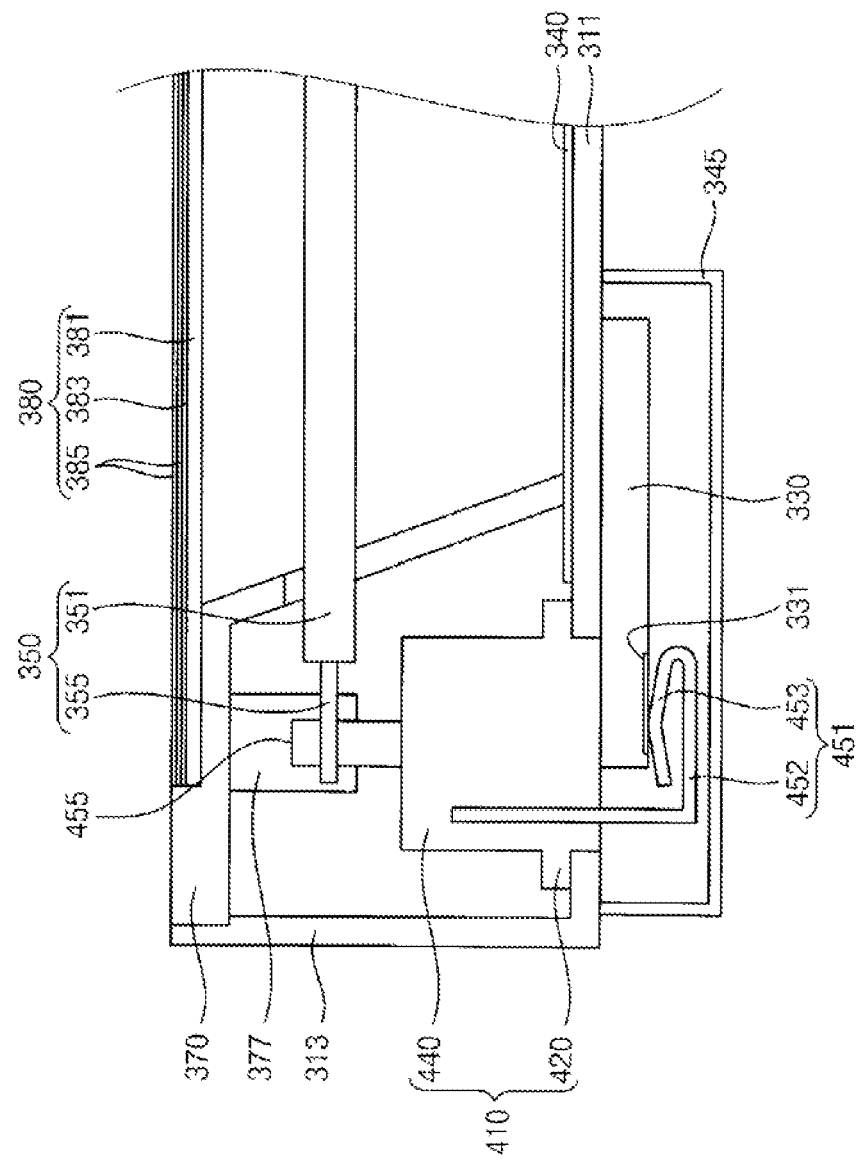
FIG. 10 is a cross-sectional view taken along a line III-III' shown in FIG. 6.
Figure 11:
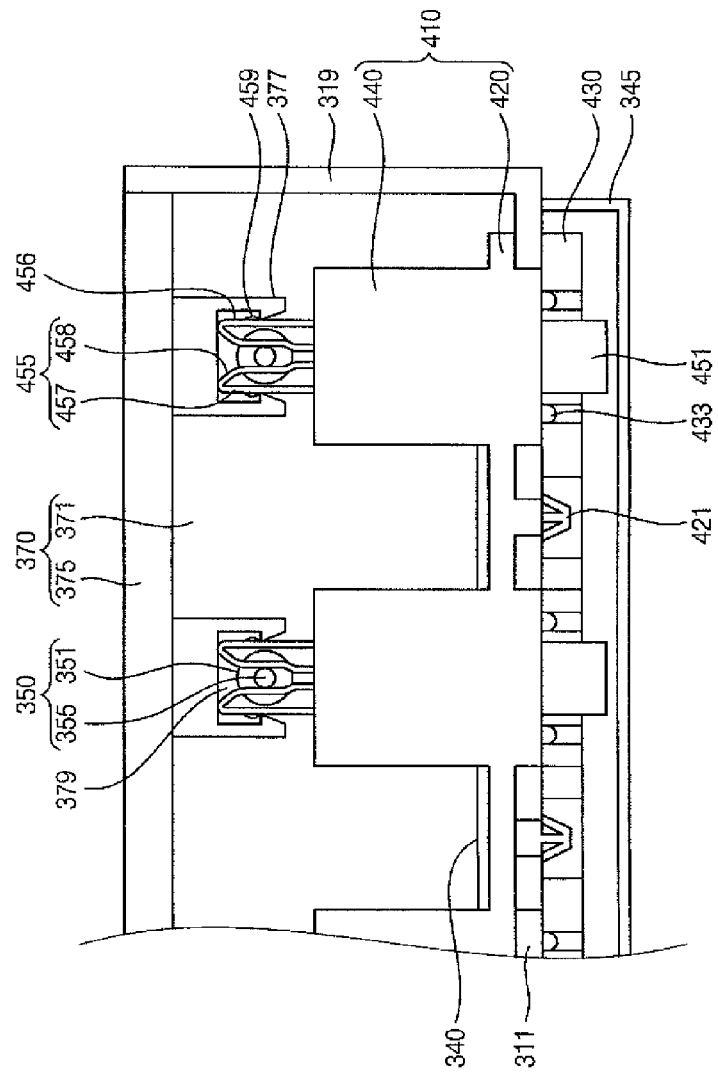
FIG. 11 is a cross-sectional view taken along a line IV-IV' shown in FIG. 6.

FIG. 10 is a cross-sectional view taken along a line III-III' shown in FIG. 6. FIG. 11 is a cross-sectional view taken along a line IV-IV' shown in FIG. 6.

Referring to FIGS. 10 and 11, when the side of the power supply substrate 330 is inserted into the space between the lamp holder 440 and the inverter connecting part 451, the aligning protrusion 433 formed on the lower surface of the lamp holder 440 is inserted into the aligning hole 335 formed through the power supply substrate 330. Thus, the output terminal 331 makes contact with the inverter connecting part 451. An electric power receiving portion 453 of the inverter connecting part 451 is elastically deformed to make contact with the output terminal 331. Thus, the power supply member 450 is electrically connected to the power supply substrate 330.

The backlight assembly 300 may further include a protecting case 345 that protects the power supply substrate 330 and blocks electromagnetic interference.

A lead wire 355 disposed on an end portion of a lamp body 351 may be interposed between a first lamp connecting part 455 and a second lamp connecting part 456 that are protruded from an upper portion of a connecting hole 441. The lead wire 355 may make contact with the first and second lamp connecting parts 455 and 456. Alternatively, the lead wire 355 may be spaced apart from the first and second lamp connecting parts 455 and 456.

The backlight assembly 300 may further include a plurality of side covers 370 and optical sheets 380.

Each of the side covers 370 is disposed on each of the first and second sidewalls 313 and 315 to cover the lamp sockets 405. The side covers 370 protect the lamp sockets 405. In addition, the side cover 370 presses the first and second lamp connecting parts 455 and 456 so that each of the first and second lamp connecting parts 455 and 456 makes contact with the lead wire 355. Therefore, the side cover 370 may improve reliability of electric contact between the lead wire 355 and the first and second lamp connecting parts 455 and 456.

For example, the side cover 370 includes a side portion 371 and an upper portion 375. The side portion 371 of the side cover 370 faces the first sidewall 313 and makes contact with the bottom plate 311. A plurality of guiding grooves are formed on an edge of the side portion 371 corresponding to the lamps 350. The upper portion 375 is extended from an upper side of the side portion 371 to face the bottom plate 311. The upper portion 375 may overlap a stepped portion that is formed on the first sidewall 313.

A plurality of fixing portions 377 may be formed on a rear surface of the upper portion 375, and a stepped portion may be formed on the upper surface of the upper portion 375. The fixing portions 377 correspond to the lamp holders 440, respectively. A fixing recess 379 may be formed on an end portion of each of the fixing portions 377. An edge of the fixing recess 379 may have a hook shape. When the side cover 370 is arranged on the bottom plate 311, the first and second lamp connecting parts 455 and 456 are pressed into the fixing recesses. Thus, the first and second lamp connecting parts 455 and 456 may make secure contact with the lead wire 355.

A holding protrusion 459 that is formed on each of the first and second lamp connecting parts 455 and 456 is supported by the fixing recess 379 of the fixing portion 377 so that the first and second lamp connecting parts 455 and 456 are supported by the fixing recess 379. Thus, the lamps 350 are electrically connected to the power supply substrate 330 through the lamp socket 405.

The optical sheets 380 may improve optical characteristics of the light generated from the lamps 350. The optical sheets 380 include a diffusion plate 381, a diffusion sheet 383 and a prism sheet 385 that are stacked in sequence. The diffusion plate 381, the diffusion sheet 383 and the prism sheet 385 are supported by the stepped portions formed on the third sidewall 317, the fourth sidewall 319 and the side cover 370. The optical sheets 380 may further include a plurality of prism sheets 385 and/or a brightness enhancement sheet (not shown).

The diffusion plate 381 diffuses the light generated from the lamps 350 to increase luminance uniformity of the light. The diffusion sheet 383 also diffuses the diffused light passed through the diffusion plate 381. The prism sheet 385 guides the diffused light toward a front direction of the backlight assembly 300, thereby improving a luminance when viewed from a plane.

According to exemplary embodiments of the present invention, the lamps 350 may be electrically connected to the power supply substrate 330 by using only the socket housing 410 and the power supply member 450. In addition, the number of elements of the lamp socket can be decreased.

Figure 12:
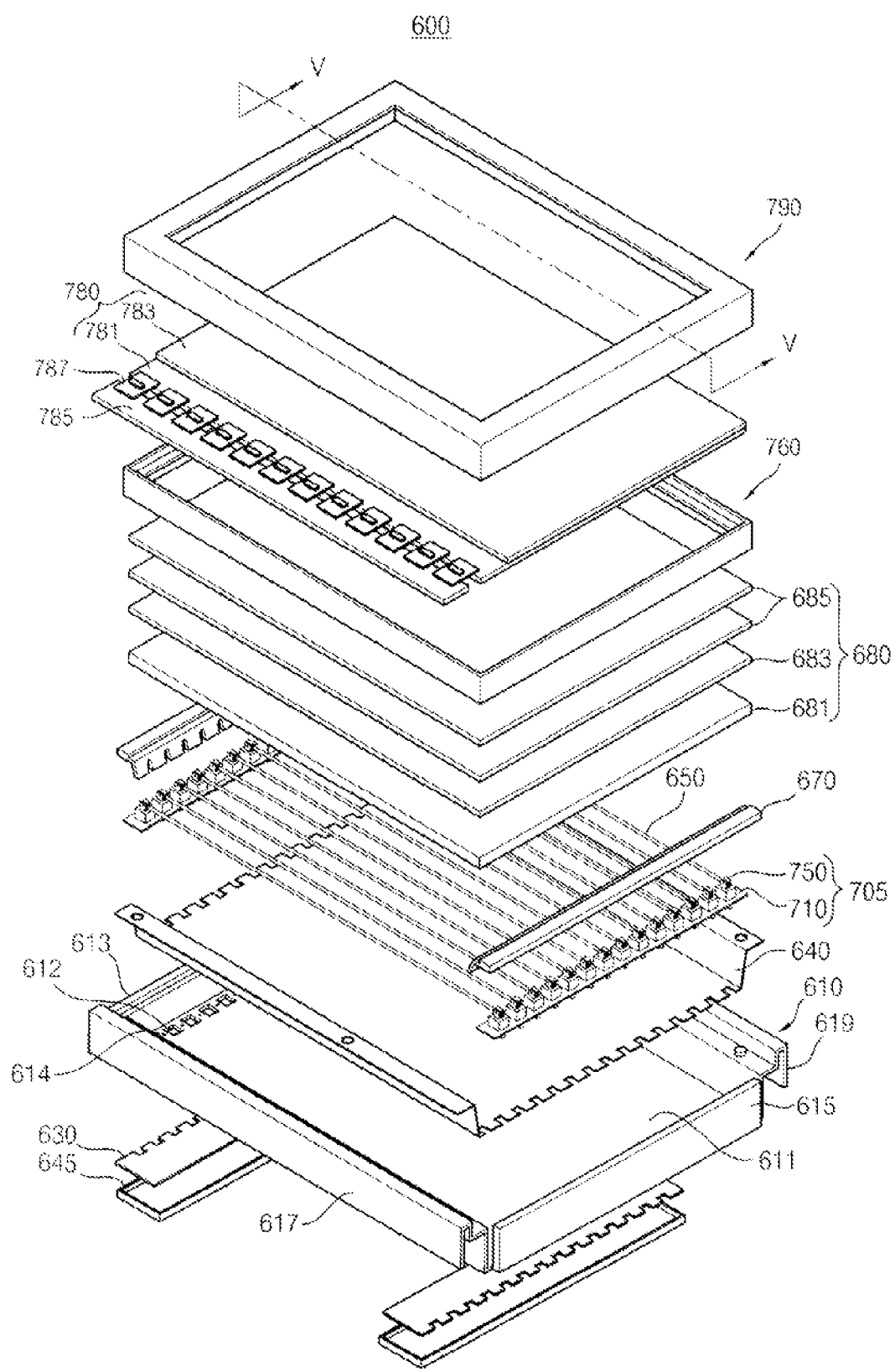
FIG. 12 is an exploded perspective view illustrating a display device in accordance with an exemplary embodiment of the present invention.
Figure 13:
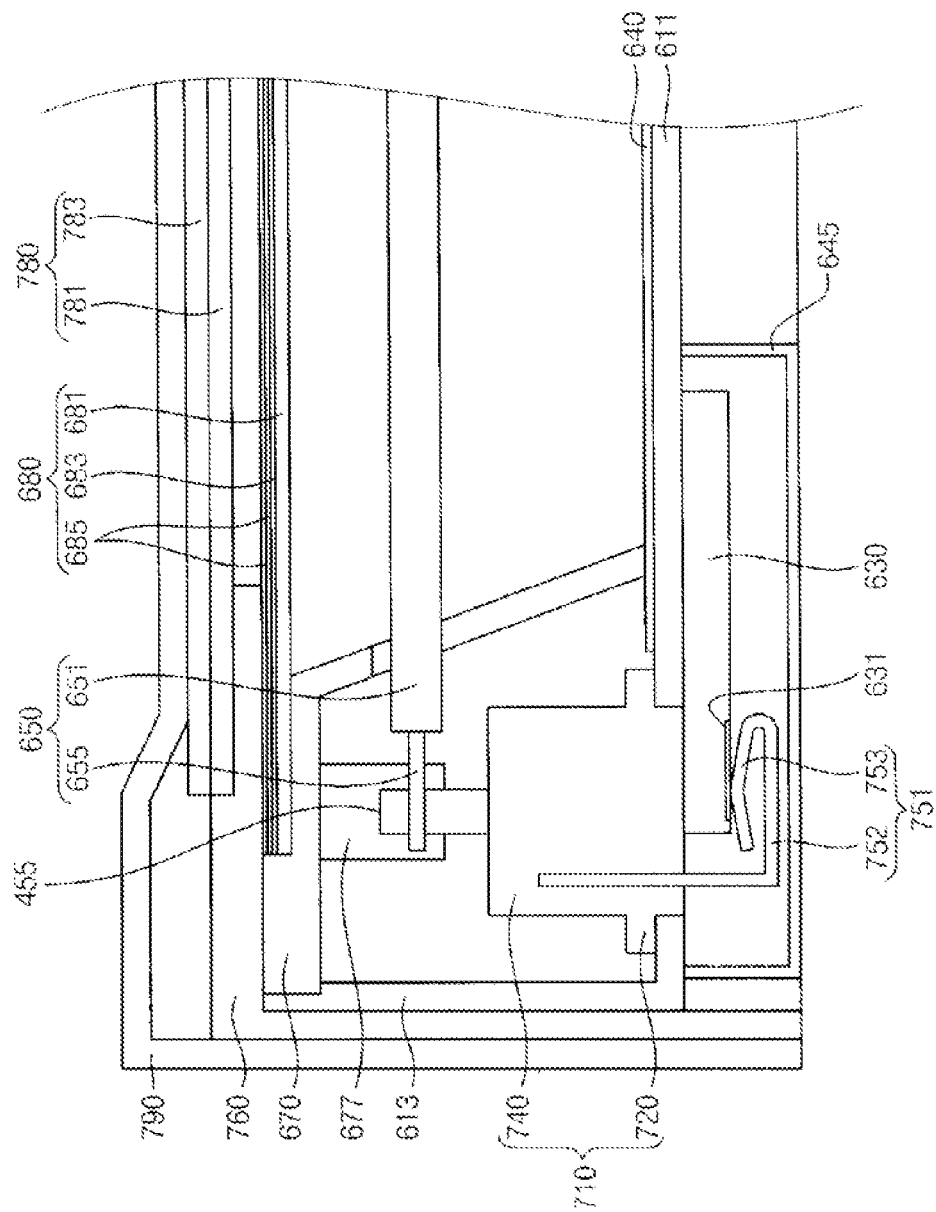
FIG. 13 is a cross-sectional view taken along a line V-V' shown in FIG. 12.

FIG. 12 is an exploded perspective view illustrating a display device in accordance with an exemplary embodiment of the present invention. FIG. 13 is a cross-sectional view taken along a line V-V' shown in FIG. 12.

Referring to FIGS. 12 and 13, the display device 600 includes a receiving container 610, a lamp socket 705, a power supply substrate 630, a plurality of lamps 650, a plurality of side covers 670, optical sheets 680 and a display panel 780. The display device 600 may further include a plurality of lamp sockets 705 that are integrated. The receiving container 610, the lamp socket 705, the power supply substrate 630, the lamps 650, the side covers 670 and the optical sheets 680 of FIGS. 12 and 13 are substantially the same as in FIGS. 6 to 11. Thus, the same reference numerals will be used to refer to the same or like parts as those described in FIGS. 6 to 11 and any further explanation concerning the above elements will be omitted.

The display device 600 may further include a middle frame 760. The middle frame 760 covers a peripheral portion of the optical sheets 680, and is combined with the receiving container 610.

The display panel 780 displays an image based on light passed through the optical sheets 680. The display panel 780 includes a first substrate 781, a second substrate 783 and a liquid crystal layer (not shown). The second substrate 783 faces the first substrate 781. The liquid crystal layer is interposed between the first and second substrates 781 and 783.

The display device 600 may further include a panel PCB 785 and a connecting film 787. The panel PCB 785 applies panel driving signals to the display panel 787. The connecting film 787 is electrically connected between the first substrate 781 and the panel PCB 785.

The display device 600 may further include a top chassis 790 combined with the receiving container 610 or the middle frame 760, and has an opening through which an effective display region of the display panel 780 is exposed.

According to exemplary embodiments of the present invention, a lamp socket includes a socket housing which is a single molded element and a power supply member to electrically connect lamps with a power supply substrate. Therefore, the lamps may be easily connected to the power supply substrate and the number of elements of the lamp socket may be decreased, In addition, the lamps are combined with the power supply substrate through a removable combination. Thus, a wiring and soldering process for electric connection between the lead wiring of the lamp and the lamp socket, and between the lamp socket and the power supply substrate may be omitted, so that a manufacturing process for assembling the backlight assembly and the display device may be simplified.

Furthermore, a power supply substrate having a defect may be easily removed from the lamp socket so that the power supply substrate may be substituted. Thus, the backlight assembly and the display device may be easily repaired.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
   a receiving container including a bottom plate having an opening and a sidewall protruded from a side of the bottom plate;
   a plurality of lamps disposed on the bottom plate, each of the lamps including a lamp body and an electrode portion disposed on an end portion of the lamp body;
   a lamp socket inserted into the opening the lamp socket including:
      a socket housing having a plurality of connecting holes extended in a first direction with respect to the receiving container; and
      a plurality of power supply members in the connecting holes, respectively, the power supply members including:
         a plurality of lamp connecting parts protruded toward the bottom plate of the receiving container to make contact with the end portions, respectively; and
         an inverter connecting part integrally formed with a lamp connecting part; and
   a power supply substrate including a plurality of output terminals disposed on a side of the power supply substrate, the output terminals making contact with the inverter connecting parts.

2. The backlight assembly of claim 1, further comprising a side cover including:
   a side portion having a plurality of guiding grooves to guide the lamps;
   an upper portion extended from the side portion to cover the lamp socket; and
   a plurality of fixing portions protruded from a bottom surface of the upper portion to connect the lamp connecting parts with the electrode portions.

3. The backlight assembly of claim 2, wherein a fixing recess, into which each of the lamp connecting parts is inserted, is formed at each of the fixing portions.

4. The backlight assembly of claim 3, wherein each of the lamp connecting parts comprises:
   a catching portion extended in the first direction to face the fixing recess; and
   a contact portion bent from an upper portion of the catching portion to make contact with the electrode portion.

5. The backlight assembly of claim 4, wherein the catching portion comprises a holding protrusion combined with the fixing recess.

6. The backlight assembly of claim 1, wherein the socket housing comprises:
   a connecting part facing the bottom plate; and
   a plurality of lamp holders protruded from the connecting part and received in the openings, respectively, wherein the connecting holes are formed through the lamp holders.

7. The backlight assembly of claim 6, wherein a first fixing portion is formed on the connecting part between the lamp holders, and
   a second fixing portion combined with the first fixing portion is formed on the bottom plate.

8. The backlight assembly of claim 6, wherein the side of the power supply substrate is inserted into a space between a lower surface of the lamp holders and the inverter connecting parts facing the lower surface of the lamp holders.

9. The backlight assembly of claim 8, wherein a plurality of grooves are formed on the side of the power supply substrate between the output terminals.

10. The backlight assembly of claim 8, wherein a first aligning part is formed on a lower surface of each of the lamp holders adjacent to the connecting holes, and
   a second aligning part combined with the first aligning part is formed on the power supply substrate.

11. A display device comprising:
   a receiving container including a bottom plate having a plurality of openings and a sidewall protruded from a side of the bottom plate;

a plurality of lamps disposed on the bottom plate, each of the lamps including a lamp body and an electrode portion disposed on an end portion of the lamp body;

a lamp socket inserted into each of the openings, the lamp socket including:

a plurality of lamp holders having a plurality of connecting holes extended in a first direction with respect to the receiving container;

a connecting part integrally connecting the lamp holders; and a plurality of power supply members in the connecting holes, respectively, the power supply members protruded toward the bottom plate to make contact with the electrode portions; and a power supply substrate including a plurality of output terminals disposed on a side of the power supply substrate, the output terminals making contact with the power supply members;

a side cover to cover the lamp socket, the side cover including a plurality of fixing portions pressing an exposed portion of the power supply members to connect the power supply members with the electrode portions;

an optical sheet disposed on the side cover; and a display panel disposed on the optical sheet.

* * * * *